United States Patent [19]

Kuriya et al.

[11] Patent Number: 5,400,580
[45] Date of Patent: Mar. 28, 1995

[54] STEEL CORDS FOR RUBBER REINFORCEMENT AND PNEUMATIC RADIAL TIRES USING THE SAME

[75] Inventors: Yoshinori Kuriya, Kodaira; Yujiro Umezawa, Tokyo, both of Japan

[73] Assignee: Bridgestone Corporation, Tokyo, Japan

[21] Appl. No.: 798,951

[22] Filed: Nov. 27, 1991

[30] Foreign Application Priority Data

Nov. 29, 1990 [JP] Japan .................. 2-325766

[51] Int. Cl.⁶ .................. D02G 3/36; B60 9/00
[52] U.S. Cl. .................. 57/212; 57/213; 57/902; 152/451
[58] Field of Search .................. 57/902, 207, 214, 215, 57/216, 217, 213, 311, 212; 152/451

[56] References Cited

U.S. PATENT DOCUMENTS

| | | | |
|---|---|---|---|
| 4,332,131 | 6/1982 | Palsky et al. | 57/213 |
| 4,488,587 | 12/1984 | Umezawa et al. | 152/359 |
| 4,608,817 | 9/1986 | Brandyberry et al. | 57/213 |
| 4,707,975 | 11/1987 | Umezawa | 57/213 X |
| 4,763,466 | 8/1988 | Abe et al. | 152/451 X |
| 4,788,815 | 12/1988 | Umezawa | 57/213 X |
| 5,050,657 | 9/1991 | Umezawa | 152/451 X |

FOREIGN PATENT DOCUMENTS 0373595 12/1989 European Pat. Off. .
720149 6/1952 United Kingdom .

*Primary Examiner*—Daniel P. Stodola
*Assistant Examiner*—William Stryjewski
*Attorney, Agent, or Firm*—Sughrue, Mion, Zinn, Macpeak & Seas

[57] ABSTRACT

A steel cord for the reinforcement of rubber articles comprises a central basic layer comprised of 1 to 4 steel filaments, at least one coaxial layer arranged around the central basic layer and comprised of many steel filaments in which these filaments are twisted in the same twisting direction at the same twisting pitch, and a wrap filament spirally wound around the coaxial layer in the same twisting direction.

5 Claims, 2 Drawing Sheets

FIG_3
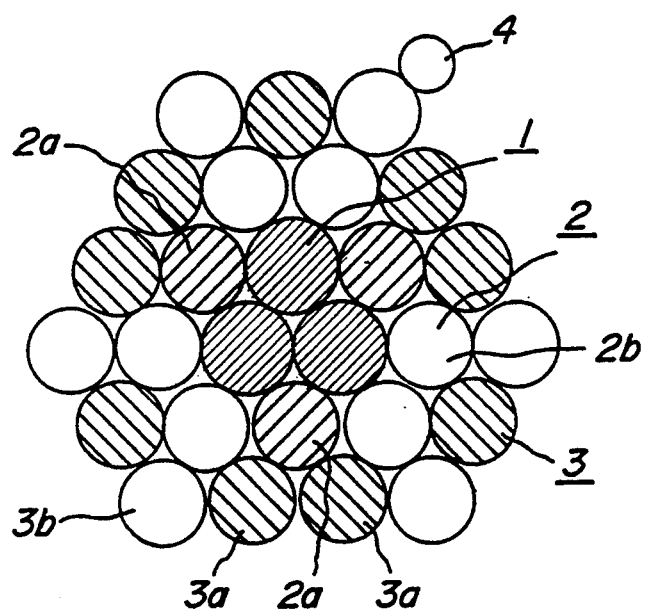
FIG_4
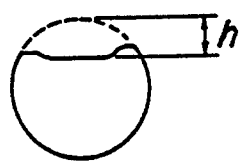

STEEL CORDS FOR RUBBER REINFORCEMENT AND PNEUMATIC RADIAL TIRES USING THE SAME

BACKGROUND OF THE INVENTION

1. Field of the Invention

This invention relates to steel cords used as a reinforcement for rubber articles such as pneumatic tires, industrial belts and the like as well as pneumatic radial tires using such steel cords as a carcass, and more particularly to an improvement of durability in this steel cord.

2. Description of the Related Art

In order to mainly enhance the resistance to corrosion fatigue in steel cords for rubber reinforcement, it is effective to accelerate the penetration of rubber into the inside of the cord. There have been made various proposals on the twisting structure attaining sufficient rubber penetration or so-called rubber penetration structure.

In tires such as truck and bus tires or light truck tires, however, since the carcass ply is comprised of two- or three-layer twisted strand cords, it is very difficult to completely penetrate rubber into the inner layer of the cord, so that the improvement of the resistance to corrosion fatigue through the rubber penetration structure is slight in such a cord.

On the other hand, as a method of enhancing the resistance to corrosion fatigue of the multi-layer twisted cord, it is known to increase the contact area between filaments constituting the inner layer (core) and filaments constituting the outer layer (sheath) in the cord by forming a compact twisted structure in which the twisting direction and the twisting pitch in each of the layers are the same.

In the running tire, the sectional area of the filament of the steel cord generally decreases due to the fretting wear and the cord strength lowers. If the decrease of sectional area in a part of the filaments inside the cord is violent, such a filament is apt to generate breakage against tensile shock and repetitive bending. When the filament is broken once, the tensile stress of the other filaments increases and hence the fatigue breakage of the cord is promoted. In order to improve the durability of the cord, therefore, it is required to avoid premature breakage of the filament among the filaments constituting the cord and it is desirable that the decrease of strength in the filament becomes uniform over the whole cord.

SUMMARY OF THE INVENTION

It is, therefore, an object of the invention to improve the durability of the steel cord used in rubber articles, particularly a carcass ply of a pneumatic radial tire such as truck and bus tires by rendering the decrease of strength of each filament resulted from the decrease of filament sectional area due to fretting wear during the running of the tire into uniform state over the whole cord.

The inventors have made studies with respect to cords stabilized by spirally winding a wrap filament around a cord of compact twisted structure as regards the decrease of strength in the filament (filament diameter: 0.15–0.25 mm) constituting the cord for the carcass ply of the running tire. They have found that among the filaments constituting the outermost layer of the cord, filaments each contacting with adjoining filaments among the filaments constituting the inner layer of the cord (hereinafter referred to as inner sheath filament) have a small decrease of strength as compared with the remaining filaments in the outermost layer (hereinafter referred to as outer sheath filament). Also a main factor of the decrease of strength is a fretting wear between wrap filament and filament constituting the cord.

Moreover, the decrease of strength in the outer sheath filament is large as compared with the sheath filament in the cord of usual layer-twisted structure. It has been confirmed that this phenomenon is caused even in a normal compact cord constituted with filaments having the same diameter or a compact cord improved by making filament in a part or whole of the sheath slightly finer than filament of the core (ratio of filament diameter of core to filament diameter of sheath=1.03–1.25).

Further, the inventors have made studies with respect to cords wherein the wrap filament being a main cause on the decrease of strength is removed to prevent the occurrence of fretting about the wrap filament. It has been found that the occurrence of fretting is certainly prevented and the decrease of strength in the filament is less, but the restraining property of the cord is poor due to the removal of the wrap filament. Hence when the cord is extremely bent, the filaments of the cord fall apart to apply abnormal input to the filament. In this case, the rupture life of the cord is largely degraded as compared with cords stabilized by winding the cord with a wrapping filament. That is, it is clearly required to restrain the filaments of the cord in any form in order to prevent the decrease of the cord life due to the extreme bending input.

As a result of the above studies, it has been found that in the cords of compact structure for a carcass ply, it is advantageous to mitigate the fretting wear between the wrap filament and the outer sheath filament and prevent the decrease of strength in the outer sheath filament while maintaining the restraint of the filaments, and hence the invention has been accomplished.

According to a first aspect of the invention, there is the provision of a steel cord for the reinforcement of rubber articles comprising a central basic layer comprised of 1 to 4 steel filaments and at least one coaxial layer arranged around the central basic layer and comprised of many steel filaments in which these filaments are twisted in the same twisting direction at the same twisting pitch, characterized in that a wrap filament is wound around the coaxial layer in the same direction as in the twisting direction of the central basic layer and the coaxial layer.

According to a second aspect of the invention, there is the provision of a pneumatic radial tire comprising a carcass toroidally extending between a pair of bead cores and comprised of a radially arranged cord ply, characterized in that said cord is a steel cord comprising a central basic layer comprised of 1 to 4 steel filaments, at least one coaxial layer arranged around the central basic layer and comprised of many steel filaments in which these filaments are twisted in the same twisting direction at the same twisting pitch, and a wrap filament wound around the coaxial layer in the same direction as in the twisting direction of the central basic layer and the coaxial layer.

It is desirable that the wrap filament is wound around the coaxial layer at a pitch of 3–5 mm. Furthermore, when the above steel cord provided with the wrap filament is applied to the carcass ply of the radial tire, the resistance to corrosion fatigue is improved and also the decrease of strength of the cord due to the fretting between the outer sheath filament and the wrap filament can be controlled while maintaining the restraint of the filaments.

BRIEF DESCRIPTION OF THE DRAWINGS

The invention will be described with reference to the accompanying drawings, wherein:

FIGS. 1, 2 and 3 are schematic sectional views of cords having compact twisting structures of $1\times12+1$, $1\times19+1$ and $1\times27+1$, respectively; and FIG. 4 is a diagram showing a fretting depth h.

DESCRIPTION OF THE PREFERRED EMBODIMENTS

Figure 1:
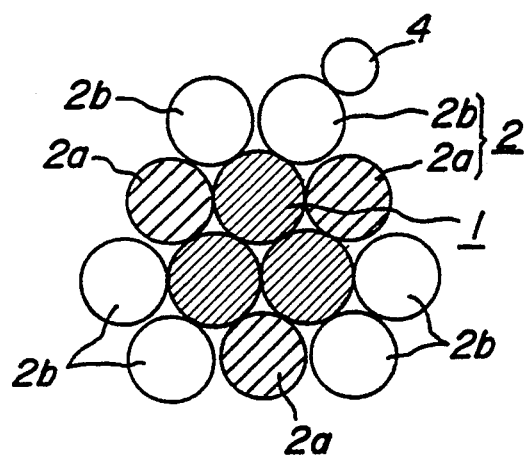
Figure 2:
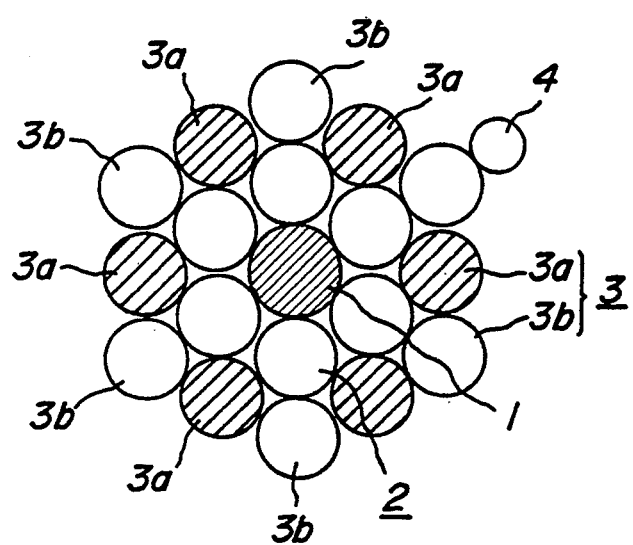

In FIGS. 1 and 2 are sectionally shown steel cords for the reinforcement of rubber articles according to the invention having twisting structures of $1\times12+1$ and $1\times19+1$, respectively. In each of FIGS. 1 and 2, a steel filament shown by crossing oblique lines forms a central basic layer (hereinafter referred to as a core) 1, and steel filaments arranged around the core 1 adjacent to each other form a coaxial layer (hereinafter referred to as sheath) 2. In the embodiment of FIG. 1, the sheath 2 is comprised of nine filaments, while the sheath of the embodiment shown in FIG. 2 consists of a first sheath 2 comprised of six filaments and a second sheath 3 arranged outside the first sheath and comprised of twelve filaments. In any case, a wrap filament 4 is spirally wound around the outermost sheath in the same direction as in the twisting directions of the core and the sheath. Among the steel filaments in the outermost sheath, the steel filaments shown by oblique lines are inner sheath filaments (2a in FIG. 1 or 3a in FIG. 2), while the remaining steel filaments are outer sheath filaments (2b in FIG. 1 or 3b in FIG. 2).

In FIG. 3 is sectionally shown another embodiment of the steel cord according to the invention having a twisting structure of $1\times27+1$, in which the first sheath 2 is comprised of nine steel filaments and the second sheath 3 is comprised of fifteen steel filaments. Moreover, the steel filaments shown by oblique lines are inner sheath filaments likewise the cases of FIGS. 1 and 2.

In the compact cord, the ununiformity of the decrease in the strength of the filament, particularly considerable decrease of strength in the outer sheath filament during the running of the tire is due to the geometrical pattern inherent to the compact twisting structure. That is, the sectional shape in the cord having a usual layer twisted structure is near to circle, so that the contact pressure between the sheath filament and the wrap filament spirally wound therearound becomes equal on each filament. On the other hand, the sectional shape in the cord having a compact structure is not circular but is angular, so that the contact pressure between the sheath filament and the wrap filament spirally wound therearound becomes not equal on filaments located at the corner portion. In the cord section of the compact structure, the contact pressure in the outer sheath filament located at the corner portion is high and that in the inner sheath filament located at a portion other than the corner portion is low.

When the twisting direction of the wrap filament restraining the movement of the filaments in the compact cord is the same as in the twisting direction of the outer sheath filament, the contact area between the outer sheath filament and the wrap filament increases and hence the contact pressure therebetween decreases. The relative momentum between the sheath filament and the wrap filament decreases in the bending of the cord and hence the reduction of sectional area and decrease of strength in the outer sheath filament are suppressed. Furthermore, since the filaments of the cord are restrained by the wrap filament, there is no cord breakage due to abnormal input to a part of scattered filaments and hence there is no lowering of the cord life.

The following examples are given in illustration of the invention and are not intended as limitations thereof.

EXAMPLE 1

Steel cords shown in Table 1 were used at an end count of 22 cords/5 cm in a carcass ply of a radial tire for truck and bus having a tire size of 11/70R22.5 14PR. Then, the fretting depth and cord breakage at a large bending input were tested with respect to the tires by running on a drum at a speed of 60 km/hr under an internal pressure of 8 kgf/cm$^2$ (usual running) or 1 kgf/cm$^2$ (large bending input) and a load corresponding to JIS 100% load (usual running) or JIS 40% load (large bending input). In the carcass ply, the steel cord had a layer twisting structure of $3+9+1$ (Comparative Example 1: control), a normal compact structure of $1\times12+1$ (Comparative Example 2), a compact structure of $1\times12+1$ being different in the filament diameter between core and sheath (Comparative Example 3), or a compact structure of $1\times12$ having no wrap filament (Comparative Example 4), while the steel cord according to the invention had a compact structure of $1\times12+1$S being different in the filament diameter between core and sheath (Example 1). The measured results are shown in Table 1 by an index value on the basis that the control is 100.

TABLE 1

|  | Comparative Example 1 | Comparative Example 2 | Comparative Example 3 | Comparative Example 4 | Example 1 |
|---|---|---|---|---|---|
| Twisting structure | $3+9+1$ | $1\times12$ cc $+1$ | $1\times12$ cc $+1$ | $1\times12$ cc | $1\times12$ cc $+1$ |
| Twisting direction | S/S/Z | S/Z | S/Z | S | S/S |
| Twisting pitch | 6.0/12.0/3.5 | 12.0/3.5 | 12.0/3.5 | 12.0 | 12.0/3.5 |
| Filament diameter (mm) | | | | | |
| core | 0.23 | 0.23 | 0.24 | 0.24 | 0.24 |
| sheath | 0.23 | 0.23 | 0.225 | 0.225 | 0.225 |
| wrap | 0.15 | 0.15 | 0.15 | none | 0.15 |
| Fretting depth through warp filament | 100 | 130 | 128 | 0 | 7 |
| Cord breakage at | absence* | absence* | absence* | presence | absence* |

TABLE 1-continued

|  | Comparative Example 1 | Comparative Example 2 | Comparative Example 3 | Comparative Example 4 | Example 1 |
| --- | --- | --- | --- | --- | --- |
| large bending input |  |  |  |  |  |

*: no filament breakage

EVALUATION METHOD

(1) Fretting Depth

After the drum test under the above conditions, the sheath filaments of two cords were cut out from the tire and broken by means of a tensile testing machine. Then, the sections of the broken filaments were observed by means of a microscope to measure values of h shown in FIG. 4 assuming that the sectional shape of the original filament was circle. An average of the measured values was a fretting depth of the cord, which was represented by an index according to the following equation:

Index value = [fretting depth of test tire/fretting depth of control tire] × 100

(2) Cord breakage at large bending input

After the tire was run on the drum under the large bending input conditions over a distance of 10,000 km, the cord was cut out from the tire to observe the presence or absence of the breakage.

EXAMPLE 2

Steel cords shown in Table 2 were used at an end count of 20 cords/5 cm in a carcass ply of a radial tire for truck and bus having a tire size of 11/70R22.5 14PR. Then, the fretting depth and cord breakage at a large bending input were tested with respect to the tires by running on a drum at a speed of 60 km/hr under an internal pressure of 8 kgf/cm² (usual running) or 1 kgf/cm² (large bending input) and a load corresponding to JIS 100% load (usual running) or JIS 40% load (large bending input). In the carcass ply, the steel cord had a layer twisting structure of 1+6+12+1 (Comparative Example 5: control), a normal compact structure of 1×19+1 (Comparative Example 6), a compact structure of 1×19+1 being different in the filament diameter between core and sheath (Comparative Example 7), or a compact structure of 1×19 having no wrap filament (Comparative Example 8), while the steel cord according to the invention had a compact structure of 1×19+1S being different in the filament diameter between core and sheath (Example 2). The measured results of the fretting depth and cord breakage are shown in Table 2 by an index value on the basis that the control is 100. Moreover, the evaluation methods were the same as in Example 1.

TABLE 2

|  | Comparative Example 5 | Comparative Example 6 | Comparative Example 7 | Comparative Example 8 | Example 2 |
| --- | --- | --- | --- | --- | --- |
| Twisting structure | 1 + 6 + 12 + 1 | 1 × 19 cc + 1 | 1 × 19 cc + 1 | 1 × 19 cc | 1 × 19 cc + 1 |
| Twisting direction | S/S/Z | S/Z | S/Z | X | S/S |
| Twisting pitch | ∞/6.0/12.0/3.5 | 12.0/3.5 | 12.0/3.5 | 12.0 | 12.0/3.5 |
| Filament diameter (mm) |  |  |  |  |  |
| core | 0.20 | 0.20 | 0.22 | 0.22 | 0.22 |
| first sheath | 0.20 | 0.20 | 0.20 | 0.20 | 0.20 |
| second sheath | 0.20 | 0.20 | 0.20 | 0.20 | 0.20 |
| wrap | 0.15 | 0.15 | 0.15 | none | 0.15 |
| Fretting depth through wrap filament | 100 | 125 | 122 | 0 | 11 |
| Cord breakage at large bending input | absence* | absence* | absence* | presence | absence* |

*: no filament breakage

EXAMPLE 3

Steel cords shown in Table 3 were used at an end count of 22 cords/5 cm in a carcass ply of a radial tire for truck and bus having a tire size of 11/70R22.5 14PR. Then, the fretting depth and cord breakage at a large bending input were tested with respect to the tires by running on a drum at a speed of 60 km/hr under an internal pressure of 8 kgf/cm² (usual running) or 1 kgf/cm² (large bending input) and a load corresponding to JIS 100% load (usual running) or JIS 40% load (large bending input). In the carcass ply, the steel cord had a layer twisting structure of 3+9+15+1 (Comparative Example 9: control), a normal compact structure of 1×27+1 (Comparative Example 10), a compact structure of 1×27+1 being different in the filament diameter between core and sheath (Comparative Example 11), or a compact structure of 1×27 having no wrap filament (Comparative Example 12), while the steel cord according to the invention had a compact structure of 1×27+1S being different in the filament diameter between core and sheath (Example 3). The measured results of the fretting depth and cord breakage are shown in Table 3 by an index value on the basis that the control is 100. Moreover, the evaluation methods were the same as in Example 1.

TABLE 3

|  | Comparative Example 9 | Comparative Example 10 | Comparative Example 11 | Comparative Example 12 | Example 3 |
| --- | --- | --- | --- | --- | --- |
| Twisting structure | 3 + 9 + 15 + 1 | 1 × 27 cc + 1 | 1 × 27 cc + 1 | 1 × 27 cc | 1× 27cc + 1 |
| Twisting direction | S/S/Z/S I | S/Z | S/Z | S | S/S |
| Twisting pitch | 5.5/10.5/15.5/3.5 | 15.5/3.5 | 15.5/3.5 | 15.5 | 15.5/3.5 |
| Filament diameter (mm) | | | | | |
| core | 0.175 | 0.175 | 0.19 | 0.19 | 0.19 |
| first sheath | 0.175 | 0.175 | 0.175 | 0.175 | 0.175 |
| second sheath | 0.175 | 0.175 | 0.175 | 0.175 | 0.175 |
| warp | 0.15 | 0.15 | 0.15 | none | 0.15 |
| Fretting depth through wrap filament | 100 | 129 | 126 | 0 | 15 |
| Cord breakage at large bending input | absence* | absence* | absence* | presence | absence* |

*: no filament breakage

As mentioned above, in the radial tires according to the invention, steel cords of compact twisted structure in which the wrap filament is spirally wound in the same direction as in the twisting directions of the central basic layer and coaxial layer are applied to the carcass ply, whereby the fretting wear between the outer sheath filament and the wrap filament is reduced and the decrease of strength in the filaments of the cord becomes equal to improve the cord life and consequently the durability of the tire can considerably be improved.

What is claimed is:

1. A steel cord for the reinforcement of rubber articles, comprising: a central basic layer comprised of one to four steel filaments, and at least one coaxial layer arranged around the central basic layer and comprising a plurality of steel filaments twisted in a same twisting direction and at a same twisting pitch as the central basic layer filaments, wherein a wrap filament is wound around the coaxial layer in the same twisting direction as that of the central basic layer and the coaxial layer.

2. The steel cord according to claim 1, wherein said wrap filament is wound at a pitch of 3-5 mm.

3. The steel cord according to claim 1, wherein said cord has a compact twisting structure of $1 \times 12 + 1$.

4. The steel cord according to claim 1, wherein said cord has a compact twisting structure of $1 \times 19 + 1$.

5. The steel cord according to claim 1, wherein said cord has a compact twisting structure of $1 \times 27 + 1$.

* * * * *